(12) United States Patent
Kawai et al.

(10) Patent No.: US 7,410,395 B2
(45) Date of Patent: Aug. 12, 2008

(54) PARENT-CHILD TYPE BOAT WITH GENERATOR

(75) Inventors: Takao Kawai, Shizuoka-ken (JP); Noboru Kobayashi, Shizuoka (JP); Yukio Matsushita, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/209,495

(22) Filed: Aug. 22, 2005

(65) Prior Publication Data

US 2006/0048692 A1 Mar. 9, 2006

(30) Foreign Application Priority Data

Aug. 20, 2004 (JP) ............................. 2004-240214

(51) Int. Cl.
*B63H 21/17* (2006.01)
*B63B 21/56* (2006.01)
*B63B 35/73* (2006.01)
*B60L 11/00* (2006.01)
*B60L 11/18* (2006.01)

(52) U.S. Cl. ........................ 440/6; 114/248; 114/259; 114/263

(58) Field of Classification Search ............... 440/6; 114/248, 258–263
See application file for complete search history.

(56) References Cited

U.S. PATENT DOCUMENTS

| | | | | |
|---|---|---|---|---|
| 3,076,205 A | * | 2/1963 | Schultz | ........................ 114/256 |
| 4,343,098 A | * | 8/1982 | Balligand et al. | .............. 37/313 |
| 5,105,753 A | * | 4/1992 | Chih et al. | .................... 114/315 |
| 5,301,096 A | * | 4/1994 | Klontz et al. | .................. 363/37 |
| 5,775,250 A | | 7/1998 | Kobayashi et al. | |
| 6,035,796 A | * | 3/2000 | Vowels | ........................ 114/248 |
| 6,854,410 B1 | * | 2/2005 | King et al. | .................... 114/244 |
| 7,077,072 B2 | * | 7/2006 | Wingett et al. | .............. 114/312 |
| 2002/0182946 A1 | * | 12/2002 | Tanaka | .......................... 440/6 |
| 2003/0193311 A1 | * | 10/2003 | Konrad et al. | ............... 320/103 |
| 2006/0191457 A1 | * | 8/2006 | Murphy | ...................... 114/253 |

FOREIGN PATENT DOCUMENTS

| | | | | |
|---|---|---|---|---|
| GB | 2340318 A | * | 2/2000 | |
| JP | 0508547 A | * | 4/1993 | |
| JP | 07223589 A | * | 8/1995 | |
| JP | 08230785 A | * | 9/1996 | |
| JP | 3053195 B2 | | 4/2000 | |
| JP | 2001225794 | * | 8/2001 | |
| WO | WO 2005080124 A2 | * | 9/2005 | |

* cited by examiner

*Primary Examiner*—Ajay Vasudeva
(74) *Attorney, Agent, or Firm*—Knobbe, Martens, Olson & Bear LLP (57) ABSTRACT

A parent-child type boat having an electric power generating device, such as a fuel cell. The boat includes a parent boat and at least one child boat which is smaller than the parent boat. The parent boat is equipped with a generating device. The child boat is equipped with a battery and an electric propulsion device. When the child boat is docked with the parent boat and electrically connected thereto, power can be supplied to at least one of the battery and the electric propulsion device of the child boat from the generating device of the parent boat.

17 Claims, 6 Drawing Sheets

PARENT-CHILD TYPE BOAT WITH GENERATOR

PRIORITY INFORMATION

This application claims priority to Japanese patent application Serial No. 2004-240214, filed on Aug. 20, 2004, the entire contents of which is hereby expressly incorporated by reference.

BACKGROUND OF THE INVENTIONS

1. Field of the Inventions

The present inventions relate to parent-child type boats with a generator capable of being used, for example, for an excursion on water.

2. Description of the Related Art

Small boats, including personal watercraft, have become more popular in recent years. Personal watercraft are quite sporting in nature and typically hold one to four or five passengers.

It has also become more popular to take longer trips on small watercraft, including personal watercraft, and riding with larger groups of people. When taking a longer trip on a small watercraft and/or when riding with larger groups of people, it can be enjoyable to allow operators and riders to switch watercraft, and/or let some riders take breaks. However, often times, it can be inconvenient to find a place that is appropriate to dock the watercraft. For example, in many places, "beaching" watercraft is prohibited. Additionally, marinas and boat ramps can be crowded. Further, personal and other types of small watercraft have limited storage space. Thus, it can be difficult to carry all of the supplies one may desire on a longer excursion, particularly for overnight or multiple-day trips.

Other boat designs have been proposed in which a large "base boat" can be used as a base for other pleasure boats while on the water. Such a base boat is propelled by a jet propulsion boat docked with the base boat. For example, Japanese Patent Document JP-B-3053195, at pages 1 to 9 and FIGS. 1 to 24, discloses such a boat.

SUMMARY OF THE INVENTIONS

An aspect of at least one of the embodiments disclosed herein includes the realization that when a "base boat" is propelled by a smaller boat, such as a personal watercraft, the smaller boat uses fuel at a much faster rate than when that boat is operated independently of the base boat. Thus, the fuel capacity of the smaller boat may be depleted of fuel before the desired destination is reached.

Thus, in accordance with an embodiment, a parent-child type boat can comprise a relatively large parent boat and at least one child boat which is smaller than the parent boat. The parent boat can be equipped with a generating device. The child boat can be equipped with a battery and an electric propulsion device. The child boat can also be configured to be electrically connectable to the generating device such that power can be supplied to at least one of the battery and the electric propulsion device of the child boat from the generating device of the parent boat.

In accordance with another embodiment, a parent-child type boat can comprise a parent boat and at least one child boat which is smaller than the parent boat. The parent boat can be equipped with an electric power generating device. The child boat can comprise a battery and an electric propulsion device. The parent-child type boat can also include means for recharging the battery of the child boat and powering the electric propulsion device of the child boat with the generating device of the parent boat.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF THE PREFERRED EMBODIMENT

Figure 1:
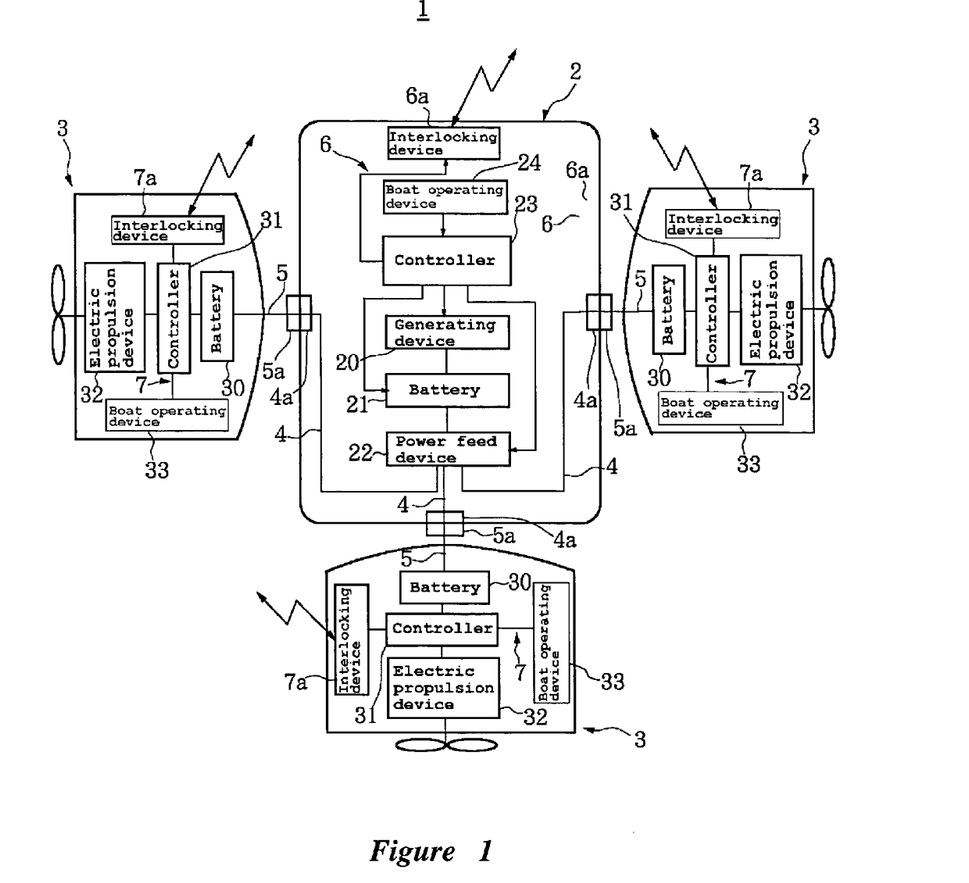
FIG. 1 is a schematic diagram of a configuration of a parent-child type boat with a generator in accordance with an embodiment.

FIG. 1 shows a schematic configuration of a parent-child type boat 1 having a propulsion system. This parent-child type boat 1 is illustrated as being used with personal watercraft because it has particular utility in this context. However, the present seat arrangement can be used in other contexts, such as, for example, but without limitation, other types of watercraft and other vehicles including land vehicles.

The parent-child type boat 1 in accordance with the illustrated embodiment includes a relatively large parent boat 2 and at least one child boat 3, which is smaller than the parent boat 2.

The parent boat 2 can be equipped with a generating device 20. The generating device can be configured to operate under any type of power generation principle.

In some embodiments, the generating device 20 can include a fuel cell, a battery 21, a power feed device 22, a controller 23, a boat operating device 24 and the like, which are connected to each other by a communication network 6. A LAN system, for example, can be used as the communication network 6. The controller 23 can be configured to control the generating device 20 based on a boat operation signal from the boat operating device 24 to charge the battery 21 with electricity produced by the generating device 20.

In the case that the generating device 20 is a fuel cell, and if the fuel cell is replenished with fuel, it continues to generate power. Also, any engine-driven generating device can be used as the generating device 20.

The child boat 3 can also be equipped with a battery 30, a controller 31, an electric propulsion device 32 and a boat operating device 33, which are connected to each other by a communicating network 7. A LAN system, for example, can be used as the communication network 7.

The electric propulsion device 32 can be controlled based on a boat operation signal from the boat operating device 24 to run the boat 3. The electric propulsion device 32 can be driven by power from the battery 30.

The electric propulsion device 32 can be a jet propulsion unit with an electric motor driving an impeller or an outboard motor with an electric motor driving a propeller. The controller 31 can be configured to control the electric propulsion device 32, which is driven by power from the battery 30, to propel the boat.

The generating device 20 of the parent boat 2 can be configured to charge the battery of the child boats 3. For example, when a child boat 3 is docked with the parent boat 2, a power line 4 of the parent boat 2 and a power line 5 of the child boat 3 can be electrically connected to each other by power line couplers 4a and 5a. When the power line 4 of the parent boat 2 and the power line 5 of the child boat 3 are connected to each other, the generating device 20 of the parent boat 2 can be driven to generate power, which is supplied to the battery 30 of the child boat 3 via the power line 4 and the power line 5 so that the battery 30 can be charged. In such a manner, the battery 30 of the child boat 3 can be charged by the generating device 20 of the parent boat 2 when the child boat 3 is docked with the parent boat 2 and electrically connected thereto.

In some embodiments, since the parent boat 2 is equipped with no electric propulsion device, the parent boat 2 runs when the child boat 3 is docked with the parent boat 2 and the electric propulsion device 32 of the child boat 3 is driven to propel both boats 2,3 together. In this case, the generating device 20 of the parent boat 2 is driven to generate power, which is supplied to the child boat 3 to drive the electric propulsion device 32. However, in the case that the generating device 20 is a fuel cell, for example, and if the fuel cell is replenished with fuel, it continues to generate power. The electric propulsion device 32 can be driven a longer time by the fuel cell as a power source, so that the travel distance of the parent boat increases.

At a destination of the parent boat 2, the child boat 3 can be undocked from the parent boat 2, and then the electric propulsion device 32 can be driven by the battery 30 of the child boat 3 so that the boat 3 can run. When the accumulated amount of power of the battery 30 is reduced, the battery of the child boat 3 can be re-charged by the generating device 20 of the parent boat 2. In such a manner, the parent boat 2 can be used as a base for one or a plurality of pleasure boats on the water.

As noted above, there can be provided a communication network 6 and an interlocking device 6a in the parent boat 2. Similarly, there can be provided a communication network 7 and an interlocking device 7a in the child boat 3. The interlocking device 6a of the parent boat 2 and the interlocking device 7a of the child boat 3 can be configured to connect the communication network 6 in the parent boat 2 and the communication network 7 in the child boat 3. As such, a boat operation signal can be transmitted between the parent boat 2 and the child boat 3 or between a plurality of child boats 3.

For example, the operator can operate one or a plurality of child boats 3 through the boat operating device 24 of the parent boat 2. Also, the operator can operates, with the boat operating device 33 of one child boat 3, the parent boat 2 or other child boats 3.

A LAN system, for example, can be used as a combination of the communication networks 6, 7 so that these networks can be easily connected to each other. Further, the communication networks 6, 7 can be connected to each other by the interlocking devices 6a, 7a to send and receive a boat operation signal. The use of the LAN systems provides higher transmission speed and requires smaller space for wiring, and also facilitates addition and replacement of boat operating equipment for example.

Figure 2:
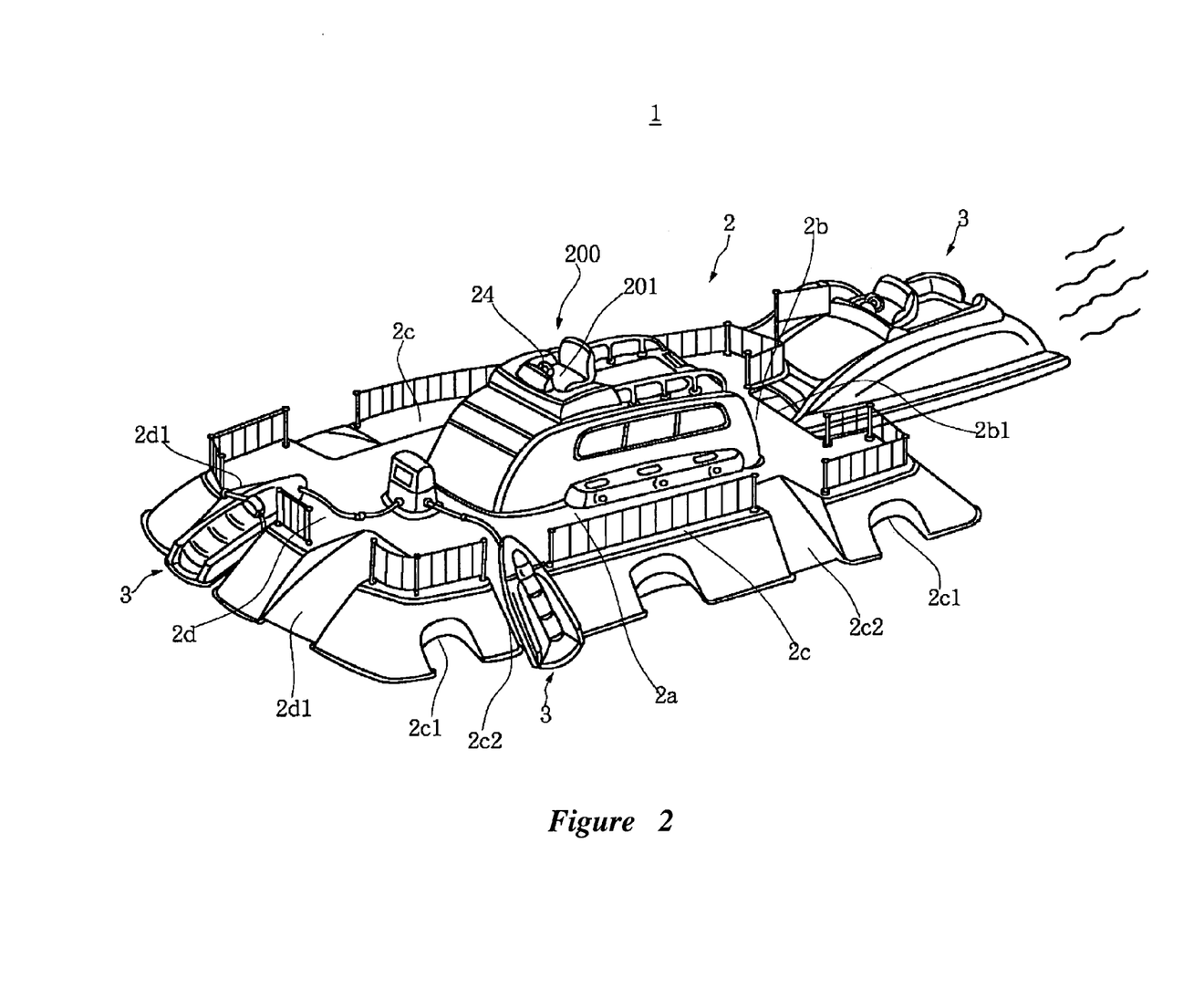
FIG. 2 is a perspective view of the parent-child type boat with a generator is running.
Figure 3:
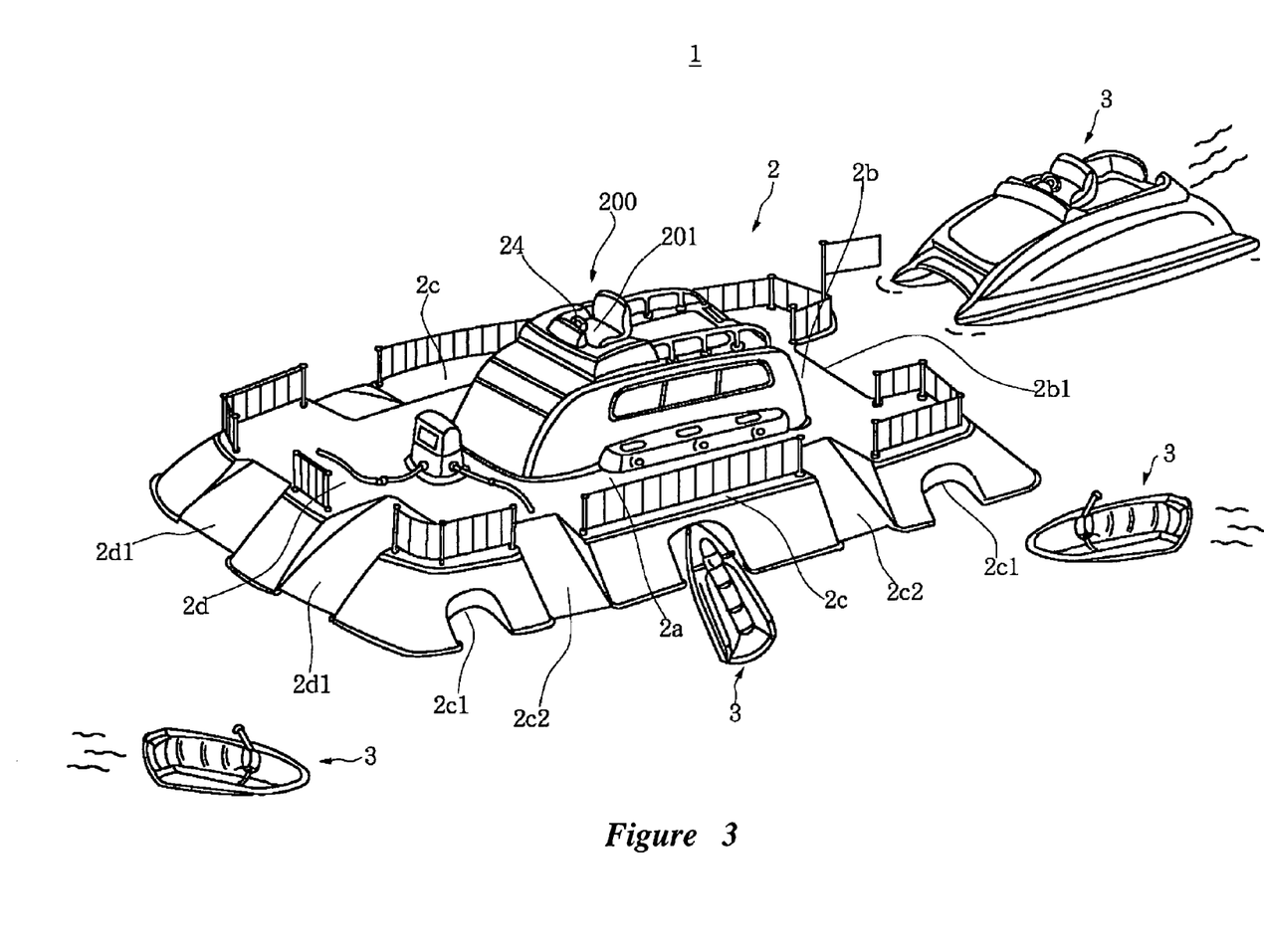
FIG. 3 is a perspective view of the parent-child type boat in a state in which the parent-child type boat is used as a base for pleasure boats.
Figure 4:
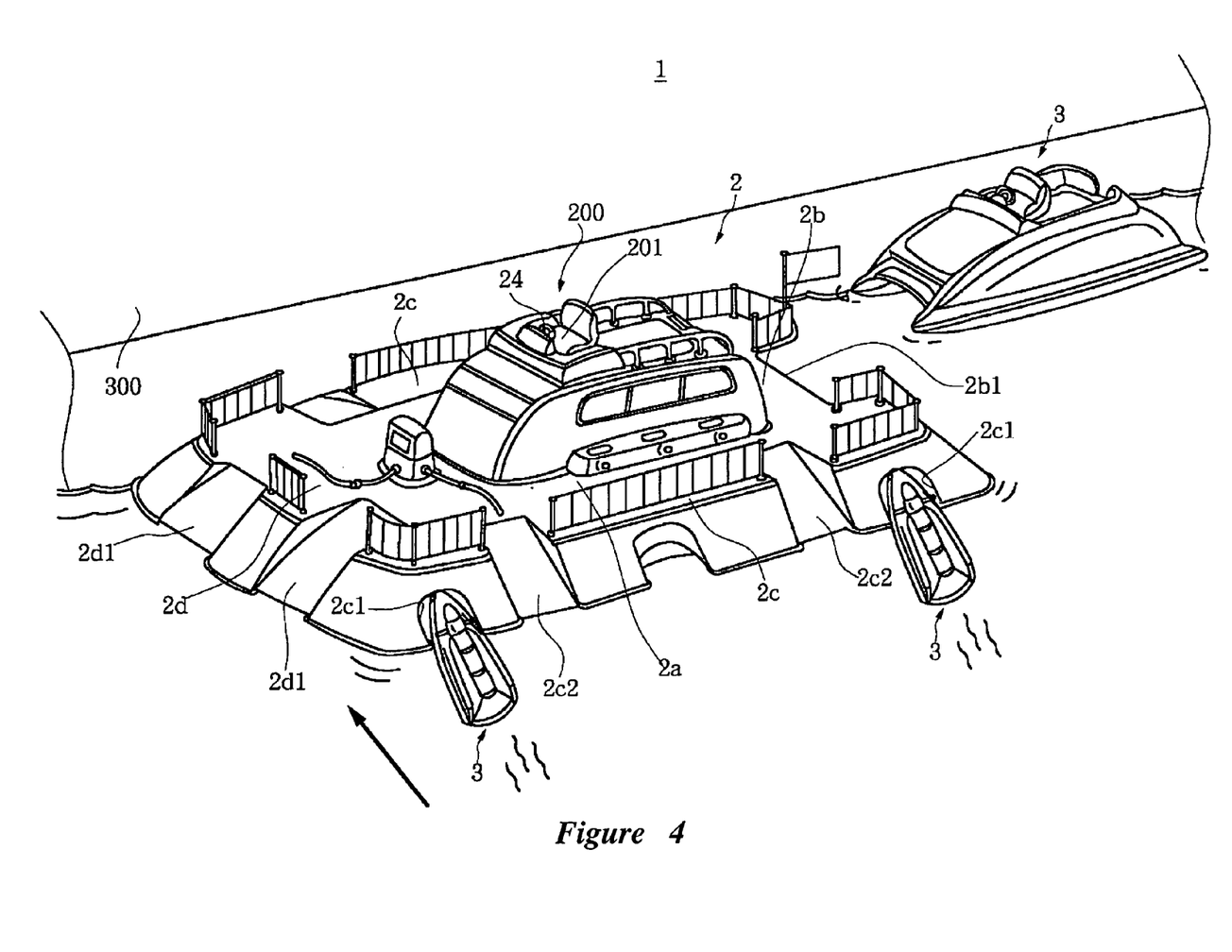
FIG. 4 is a perspective view of the parent-child type boat in a state in which the parent-child type boat with a generator is docked.

The state of the parent-child type boat with a generator 1 being used is shown in FIGS. 2 and 3. FIG. 2 shows a state in which the parent-child type boat 1 with the generator running. FIG. 3 shows a state in which the parent-child type boat 1 is used as a base for other pleasure boats. FIG. 4 shows a state in which the parent-child type boat 1 is docked.

The parent-child type boat 1 in accordance with this embodiment includes the parent boat 2 and the child boats 3 as shown in FIGS. 2 and 3. The parent boat 2 can have an operating section 200 arranged at a central portion 2a of its hull. The parent boat 2 can also have a docking portion 2b1 for docking the child boat 3 at its rear 2b with respect to its forward running direction, and a docking portion 2c1 for docking the child boat 3 at its lateral side 2c with respect to its forward running direction. The parent boat 2 can also have a loading portion 2c2 for loading the child boat 3 at its lateral side 2c with respect to its forward running direction, and a loading portion 2d1 for loading the child boat 3 at its front 2d with respect to its forward running direction.

In the case of using the plural child boats 3 for leisure, the parent-child type boat 1 runs with the child boats 3 loaded on the loading portions 2c2 and 2d1 of the parent boat 2 and tied thereto, for example, as shown in FIG. 2. Also, the child boat 3 can be docked with the docking portion 2b1 of the parent boat 2, and the operator can sit in an operator's seat 201 of the operating section 200 of the parent boat 2 and operate, though the boat operating device 24, the child boats 3 docked with the parent boat 2.

In such a manner, the child boat 3 is docked with the parent boat 2 and electrically connected thereto. The electric propulsion device 32 of the child boat 3 can then be driven with power from the generating device 20 of the parent boat 2 so that the parent boat is thereby propelled through the water.

In the case of using the parent-child type boat 1 as a base for pleasure boats, each child boat 3 loaded on the parent boat 2 can be unloaded into the water, as shown in FIG. 3. The child boats 3 docked with the parent boat 2 may be undocked for forward running independent of the boat 2. The parent boat 2 can thus be used as a base for pleasure boats on water and ensure a longer travel distance of the child boat 3.

Further, restricting the area where the child boat 3 can travel for an excursion to within a certain area centered on the base, allows control of the child boat 3, as well as moving the parent boat 2 itself as the base. In such a manner, moving the parent boat 2, while restricting the travel area of the child boat 3, to increase the travel distance of the child boat 3 allows it to safely travel a larger area for an excursion.

With reference to FIG. 4, when the operator brings the parent boat 2 to a dock 300, the child boat 3 can be docked with the docking portion 2c1 of one of the lateral sides 2c of the parent boat 2 with respect to the forward running direction thereof. The docked child boat 3 is then driven so that the parent boat 2 can move laterally or turn to dock. This is advantageous for docking of the parent boat and allows the parent boat to promptly dock.

Figure 5:
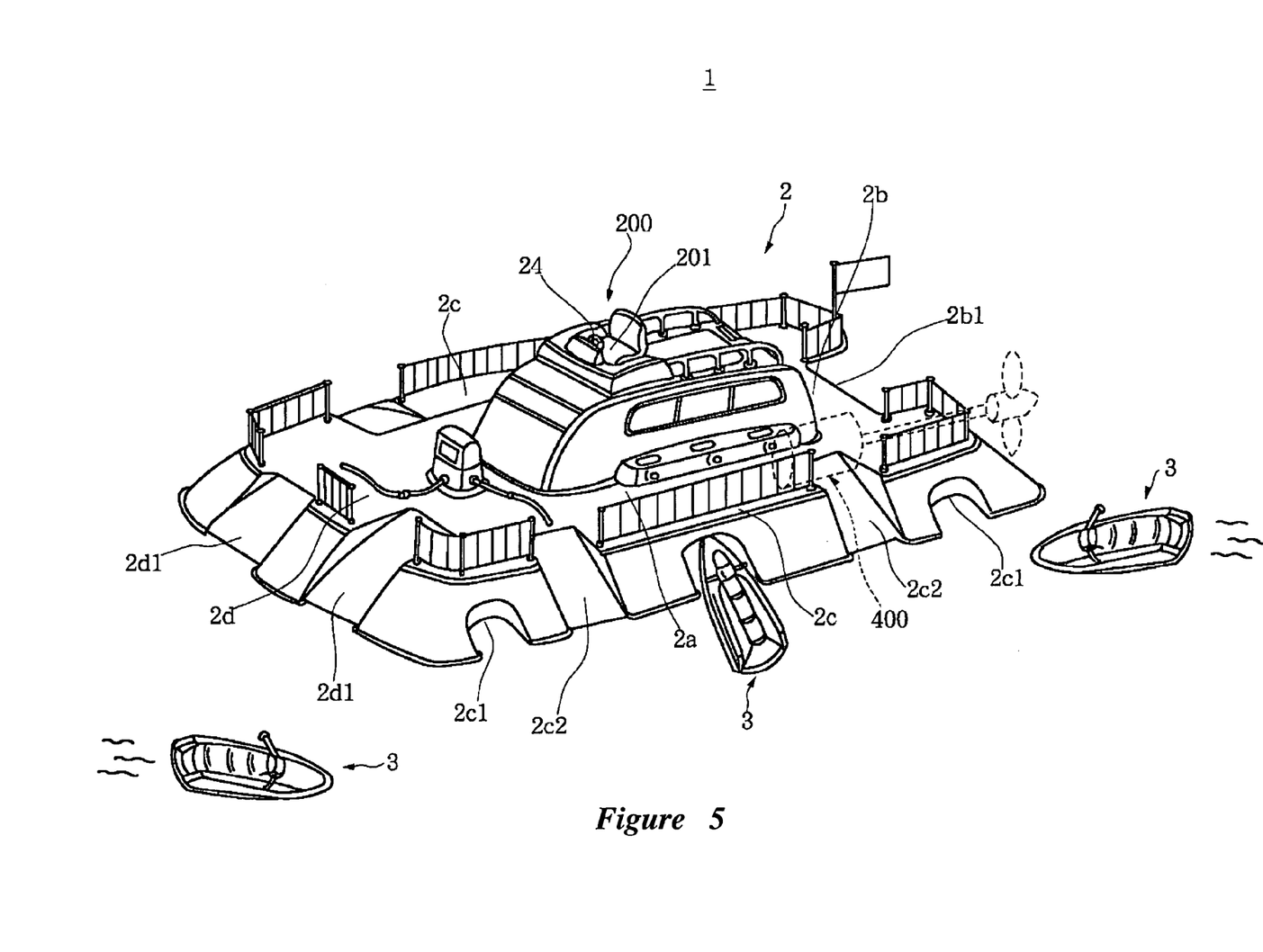
FIG. 5 is a perspective view of a modification of the parent-child type boat illustrated in FIGS. 1-4.

FIG. 5 shows another embodiment of the parent-child type boat 1. A parent-child type boat 1 in accordance with this embodiment includes a relatively large parent boat 2 having an electric propulsion device 400 mounted at its rear 2 with respect to its forward running direction.

The parent boat 2 can be configured to be propelled by a electric propulsion device 400. At a destination of the parent boat 2, a child boat 3 can be docked with a docking portion 2c1 of a lateral side of the parent boat 2 with respect to the forward running direction thereof, and a battery of the child boat 3 can then be charged. The parent boat 2 can thus be used as a base for pleasure boats on water.

Figure 6:
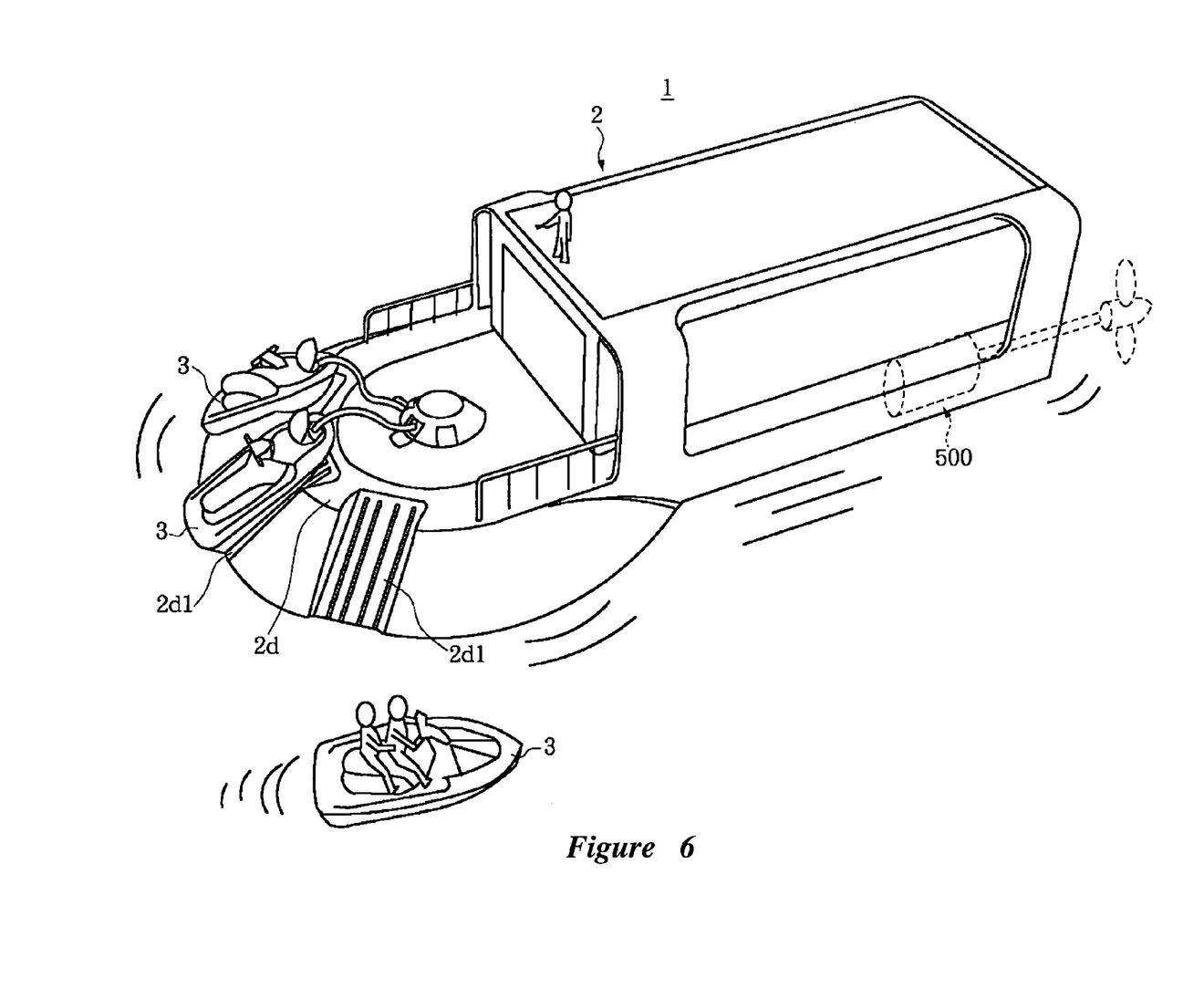
FIG. 6 is a perspective view of another modification of the parent-child type boat illustrated in FIGS. 1-4.

FIG. 6 shows another embodiment of the parent-child type boat 1. In this embodiment, a relatively large parent boat 2 includes an electric propulsion device 500 mounted at its rear 2 with respect to its forward running direction. The parent boat 2 runs with the electric propulsion device 500 being driven.

The parent boat 2 can have a loading portion 2d1 for loading a child boat 3 at its front 2d with respect to its forward running direction. At a destination of the parent boat 2, the child boat 3 can be loaded onto the loading portion 2d1 and docked therewith, and a battery of the child boat 3 can then be charged. The parent boat 2 can thus be used as a base for pleasure boats on water.

In such a manner, the child boat 3 is loaded onto the parent boat 2 such as a houseboat, and the operator runs the child boat 3 on water surrounding the parent boat 2. The child boat 3 can be loaded with a small or medium-sized battery to be lightweight. When battery power is reduced, the child boat 3 can return to the parent boat 2 to charge the battery.

What is claimed is:

1. A parent-child type boat comprising a relatively large parent boat and at least one child boat which is smaller than the parent boat, the parent boat being equipped with an electric propulsion device and a generating device, the child boat being equipped with a battery and an electric propulsion device, the child boat being configured to be electrically connectable to the generating device such that power can be supplied to at least one of the battery and the electric propulsion device of the child boat from the generating device of the parent boat, wherein the parent boat comprises at least two generally slot-shaped docking portions, each of the generally slot-shaped docking portions being configured to receive at least a bow portion of the at least one child boat such that each of the generally slot-shaped docking portions extend from one side of the at least one child boat, around the bow and to an opposite side of the child boat and with the propulsion unit of the child boat remaining in contact with water in which the parent boat is floating when the child boat is received within the generally slot-shaped docking portion such that the child boat can propel the parent boat while in the generally slot-shaped docking portion.

2. The parent-child type boat according to claim 1, wherein the parent boat comprises a docking portion for docking the child boat at least at its rear with respect to its forward running direction.

3. The parent-child type boat according to claim 2 additionally comprising an interlocking device configured for sending and receiving a boat operation signals between the parent boat and the child boat or between a plurality of child boats.

4. The parent-child type boat according to claim 1 additionally comprising an interlocking device configured for sending and receiving a boat operation signals between the parent boat and the child boat or between a plurality of child boats.

5. The parent-child type boat according to claim 1, wherein the generating device comprises a fuel cell.

6. A parent-child type boat comprising a relatively large parent boat and at least one child boat which is smaller than the parent boat, the parent boat being equipped with a generating device, the child boat being equipped with a battery and an electric propulsion device, the child boat being configured to be electrically connectable to the generating device such that power can be supplied to charge the child boat from the generating device of the parent boat, wherein the parent boat is equipped with an electric propulsion device, wherein the parent boat comprises at least two docking portions, each of the docking portions being configured to receive at least a bow portion of the at least one child boat such that the child boat extends generally perpendicular to a side of the parent boat when the child boat is received within the docking portion such that the child boat can propel the parent boat while in the docking portion.

7. The parent-child type boat according to claim 6 wherein the parent boat comprises a docking portion for docking the child boat at least at its rear with respect to its forward running direction.

8. The parent-child type boat according to claim 6 additionally comprising an interlocking device configured for sending and receiving a boat operation signals between the parent boat and the child boat or between a plurality of child boats.

9. The parent-child type boat according to claim 6, wherein the child boat is configured to be electrically connectable to the generating device such that power can be supplied to both the battery and the electric propulsion device of the child boat from the generating device and such that the child boat can be controlled to move the parent with the propulsion device of the child being positioned such that it can provide propulsion force for moving the parent boat.

10. The parent-child type boat according to claim 6, wherein the child boat is a planning-type boat.

11. The parent-child type boat according to claim 6, wherein the electric propulsion device of the child boat comprises a jet pump.

12. A parent-child type boat comprising a relatively large parent boat and at least one child boat which is smaller than the parent boat, the parent boat being equipped with a generating device, the child boat being equipped with a battery and an electric propulsion device, the child boat being configured to be electrically connectable to the generating device such that power can be supplied to at least one of the battery and the electric propulsion device of the child boat from the generating device of the parent boat, wherein the parent boat is equipped with an electric propulsion device at its rear with respect to its forward running direction, and has at least one docking portion for docking a child boat at its lateral side with respect to its forward running direction, such that the child boat extends generally perpendicular to a side of the parent boat when the child boat is received within the docking portion such that the child boat can propel the parent boat while in the docking portion.

13. A parent-child type boat comprising a relatively large parent boat and at least one child boat which is smaller than the parent boat, the parent boat being equipped with a generating device, the child boat being equipped with a battery and an electric propulsion device, the child boat being configured to be electrically connectable to the generating device such that power can be supplied to at least one of the battery and the electric propulsion device of the child boat from the generating device of the parent boat, wherein the parent boat is equipped with an electric propulsion device, wherein the electric propulsion device is disposed at a rear of the parent boat with respect to its forward running direction, and has at least one docking portion for docking a child boat at its lateral side with respect to its forward running direction, such that the child boat extends generally perpendicular to a side of the parent boat when the child boat is received within the docking portion such that the child boat can propel the parent boat while in the docking portion.

14. A parent-child type boat comprising a relatively large parent boat and at least one child boat which is smaller than the parent boat, the parent boat being equipped with an electric propulsion device and a generating device, the child boat being equipped with a battery and an electric propulsion device, the child boat being configured to be electrically connectable to the generating device such that power can be supplied to charge the battery of the child boat from the generating device of the parent boat, the parent-child type boat additionally comprising an interlocking device configured for sending and receiving a boat operation signals between the parent boat and the child boat or between a plurality of child boats, the parent boat including a docking portion such that the child boat extends generally perpendicular to a side of the parent boat when the child boat is received within the docking portion such that the child boat can be controlled from the parent boat through the interlocking device to propel the parent boat while the child boat is in the docking portion.

15. The parent-child type boat according to claim 14, wherein the interlocking device connects a communication network in the parent boat and a communication network in the child boat, or communication networks in a plurality of child boats.

16. A parent-child type boat comprising a parent boat and at least one child boat which is smaller than the parent boat, the parent boat being equipped with an electric power generating device comprising a fuel cell, the child boat comprising a battery and an electric propulsion device, and means for recharging the battery of the child boat and powering the electric propulsion device of the child boat with the generating device of the parent boat, wherein the parent boat comprises a docking portion such that the child boat extends generally perpendicular to a side of the parent boat when the child boat is received within the docking portion such that the child boat can propel the parent boat while in the docking portion.

17. A parent-child type boat comprising a parent boat and at least one child boat which is smaller than the parent boat, the parent boat comprising a docking portion configured to receive at least a portion of the child boat and means for securing the child boat to the docking portion, the parent boat being equipped with an electric power generating device, the child boat comprising a battery and an electric propulsion device, and means for recharging the battery of the child boat and powering the electric propulsion device of the child boat with the generating device of the parent boat an operator's seat disposed on the parent boat and means for controlling the propulsion device of the child boat from the operator's seat such that the child boat can propel the parent boat while the child boat is secured to the docking portion.

* * * * *